Dec. 30, 1958  J. A. MAURER, JR  2,866,398
CURTAIN SHUTTER AND SUPPORTING STRUCTURE THEREFOR
Filed March 9, 1953  3 Sheets-Sheet 1

Dec. 30, 1958   J. A. MAURER, JR   2,866,398
CURTAIN SHUTTER AND SUPPORTING STRUCTURE THEREFOR
Filed March 9, 1953   3 Sheets-Sheet 3

2,866,398

CURTAIN SHUTTER AND SUPPORTING STRUCTURE THEREFOR

John A. Maurer, Jr., New York, N. Y., assignor to J. A. Maurer, Inc., Long Island City, N. Y., a corporation of New York Application March 9, 1953, Serial No. 341,237

4 Claims. (Cl. 95—57)

This invention relates to photographic shutters and, in particular, is directed to improvements in photographic curtain shutters and in the structures supporting them.

In present day practice where the trend is towards photographic cameras which are of small physical size, yet capable of performing a great number of functions with a high degree of accuracy, it is desirable that the various component structures which go into the camera should take up as little space within the camera body as is consistent with their functioning properly. In order to reduce the cost of manufacturing such cameras it, furthermore, is desirable that those structures should be made up of as few parts as possible and allow of a design which permits of using the same part, or parts, more than once in them whenever such multiple use is feasible.

More particularly, the invention contemplates the use of that type of curtain shutter wherein preparatory to the shutter winding operation, the exposure slit is capped by moving one curtain in relation to another curtain, and wherein the size of the exposure slit, and hence the shutter speed, may be altered by changing the relative position of the two curtains. For performing the operations of winding, setting, releasing, and capping, a curtain shutter of this type, a number of satisfactory mechanisms have been devised, and any one of them may prove useful when it comes to designing a camera which is to fit a given set of specifications. It, therefore, is desirable to have a curtain shutter of the above-mentioned type, and a supporting structure for it, which may be used, without the necessity of internal structural changes, with a number of different shutter setting mechanisms.

In the event, finally, that the shutter ceases to function properly or breaks down entirely it is most desirable that it and its supporting structure can be removed from the camera as a whole for the purpose of inspection and repair. In order to facilitate such removal and to make the replacement of the parts removed less costly, likewise it is desirable to locate only the shutter setting mechanism in the camera body proper, and to assemble the supporting structure together with the shutter in a housing which is removably attached to the camera body. Thereby, removal of the shutter and its support is greatly simplified, and duplication of the shutter setting mechanism which is usually a delicate and at times an intricate device, is avoided.

It is, therefore, the primary object of the invention to provide a curtain shutter and a supporting structure for it which may be made of small physical size so that they take up less space than similar devices known heretofore, yet which are extremely reliable in performance.

Another object of the invention is the provision of a curtain shutter supporting structure which employs a minimum number of parts and, if desired, can be designed in such a manner that the same parts are used more than once in it.

Another object of the invention is the provision of a curtain shutter supporting structure which may be employed with a variety of shutter setting mechanisms.

Yet another object of the invention is the provision of a curtain shutter structure which may be easily separated from its associated shutter setting mechanism.

Still another object of the invention is the provision of a curtain shutter structure which, together with the shutter supported by it, may be removed as a unit from the camera of which it forms a part.

Still other objects and advantages of the invention include those which are hereinafter stated or apparent, or which are incidental to the invention.

In order to attain its objects the invention provides a main curtain which has an exposure slit and is, in its preferred embodiment, of substantially even width throughout its entire length. There is also provided a capping curtain which is much shorter than the main curtain, but is of such length that, when it is drawn fully across the exposure slit, light is kept from falling through the exposure slit onto the light sensitive material positioned in the focal plane of the camera. The capping curtain is entirely solid and has four tapes which extend in pairs in opposite directions longitudinally of the curtain.

The two curtains are supported by two spaced roller assemblies, a winding roller assembly and a driving roller assembly. The two assemblies can be made identical, or as nearly identical as desired. Each assembly substantially consists of a drum and two rollers which are mounted on each side of the drum. The two rollers are rigidly connected by a hollow shaft, and both they and the drum are rotatable independently of one another, the drum having its bearing on the hollow shaft. In the winding roller assembly there are provided adjacent to one of the rollers two gears, one adjacent to the other. One gear is connected to the two rollers and the other to the drum; the latter connection being made by a pin, or like means, supported by a central shaft which is inside the hollow shaft, and on which the two rollers connected by this shaft have their bearing. The drum, the two rollers, and the two gears, are coaxially arranged with respect to the central shaft, and motion may be imparted from the shutter setting mechanism through the two gears, either individually or jointly, to the drum and to the two rollers.

The same arrangement of parts may be used for the driving roller assembly in which case the drum and the two rollers are operatively connected each to an external spring by the two above-mentioned gears, or by other appropriate gearing. Alternatively, however, two coiled springs may be mounted inside the hollow shaft so that they surround the central shaft, in which case the two gears are dispensed with. One end of each spring is connected to the central shaft, while the other end engages in the one case the two rollers, in the other the drum. The latter engagement is made through a rotatable collar which has its bearing on the central shaft and carries a pin which engages the drum through a circumferential slot in the hollow shaft.

From the foregoing description of the two supporting assemblies it will readily be understood that the main curtain is to be attached to the drum, and one pair of the tapes of the capping curtain to the two rollers, of each assembly. The capping curtain will then, under control of the shutter setting mechanism, be movable relative to the main curtain both for establishing an exposure slit of a desired width by either partly or fully uncovering the slit and for capping it, and both curtains will be movable in unison under the power of the two springs associated with the driving roller assembly.

The invention will be better understood when the following description is considered with the accompanying three sheets of drawings of certain presently preferred embodiments thereof, and its scope will be pointed out in the appended claims.

Figure 8:
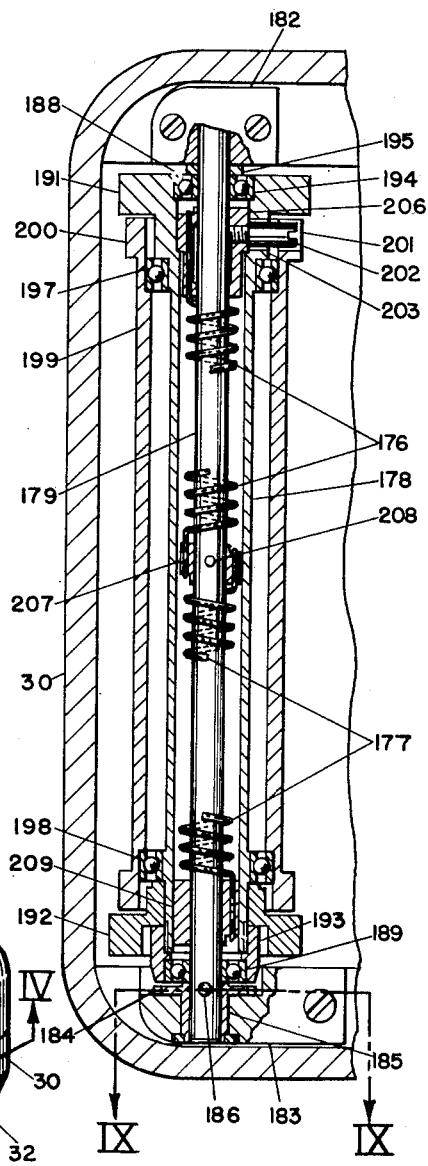
Figures 3, 9:
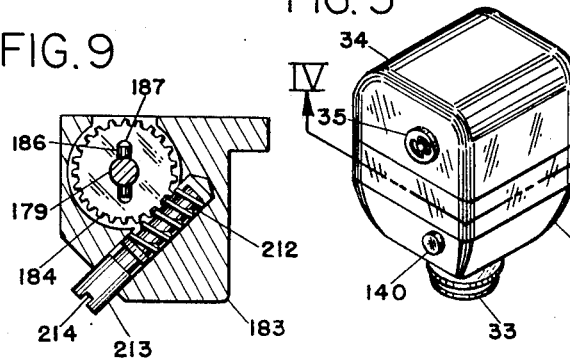
Figure 4:
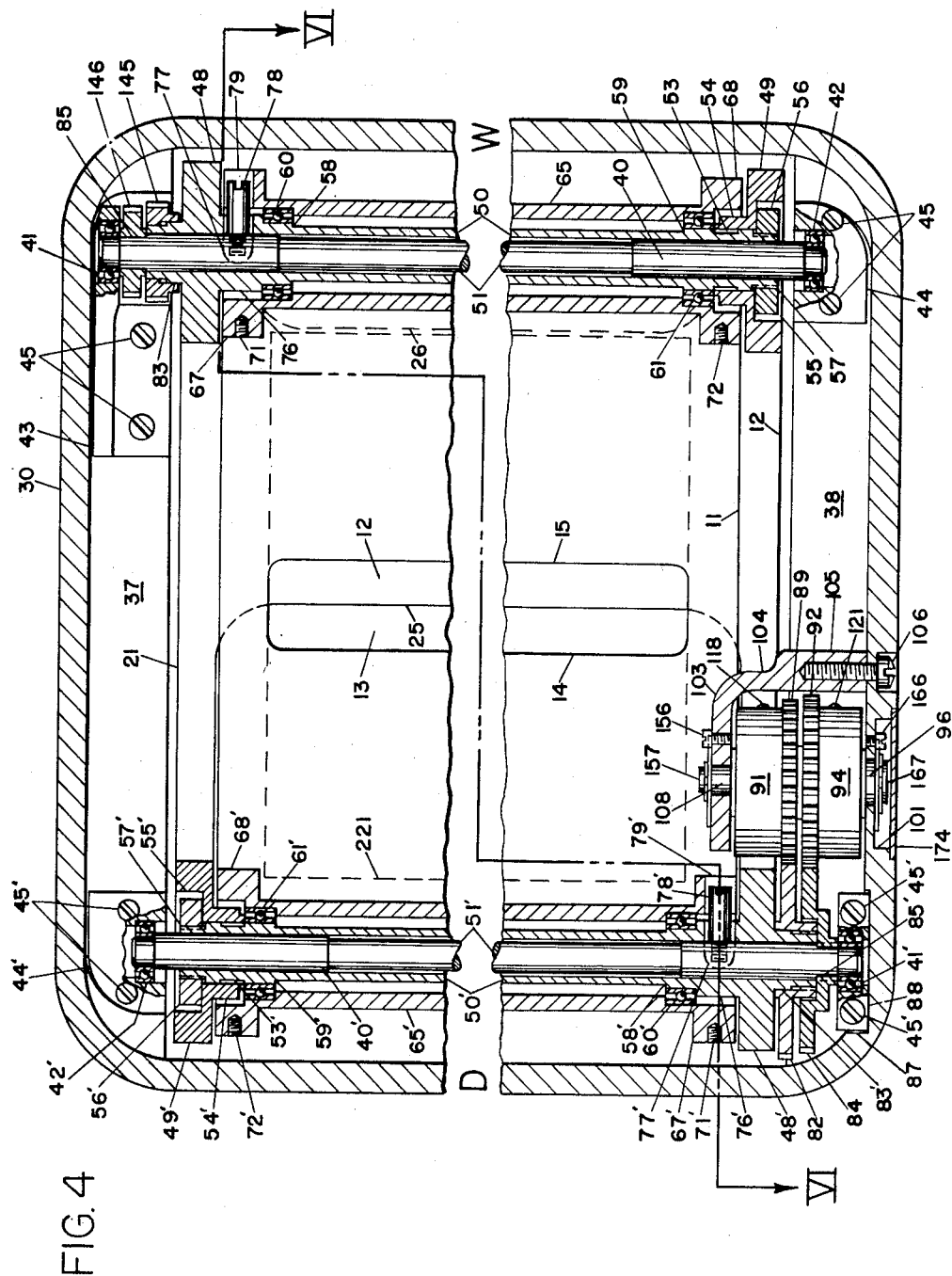
Figures 5, 6, 7:
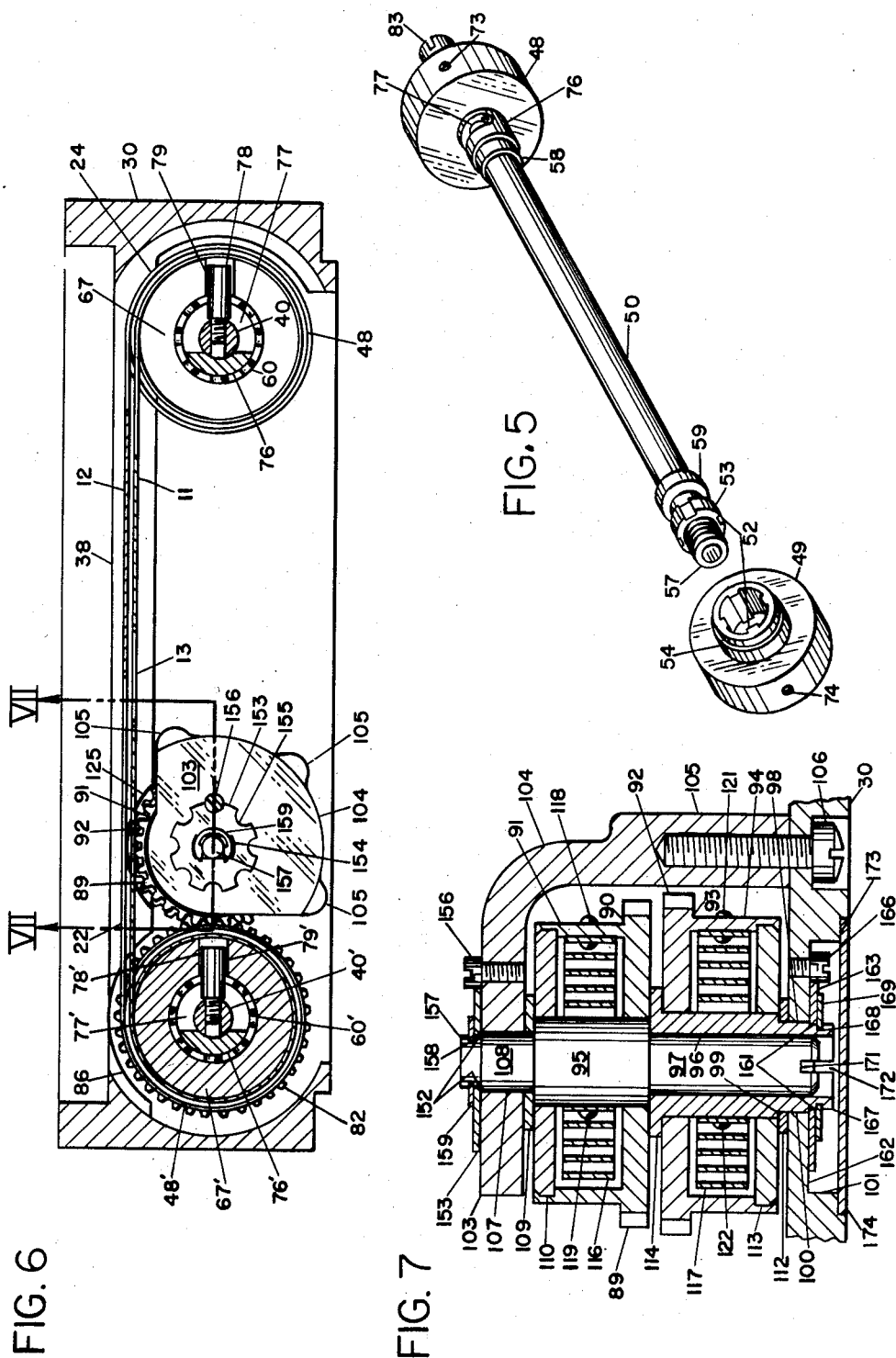

Fig. 3 is a perspective view on a substantially reduced scale of a camera comprising a camera body, a shutter housing, and a film magazine, Fig. 4 is a section, on a much larger scale, taken along the line IV—IV of Figure 3, and showing the winding and driving roller assemblies and, in a somewhat diagrammatic manner, how the main and capping curtains are supported by them, Fig. 5 is a perspective view of two rollers and a connecting hollow shaft employed in the roller assemblies of Figure 4, Fig. 6 is a section taken along the line VI—VI of Figure 4, Fig. 7 is a section, on an enlarged scale, taken along the line VII—VII of Figure 6, Fig. 8 shows, in sectional elevation, a modification of the driving roller assembly, and Fig. 9 is a section taken along the line IX—IX through a bearing block shown in Fig. 8.

Figure 1:
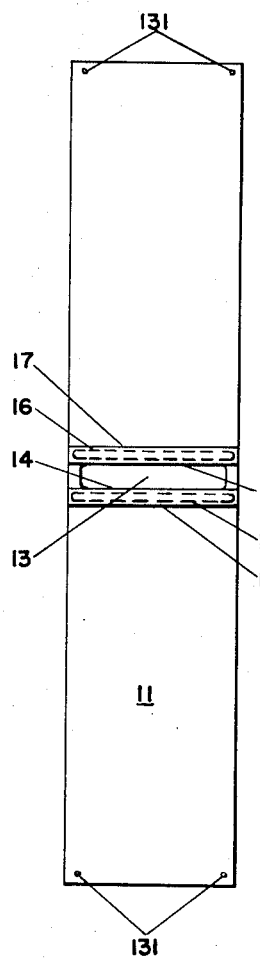
Fig. 1 is a plan view of the main curtain.
Figure 2:
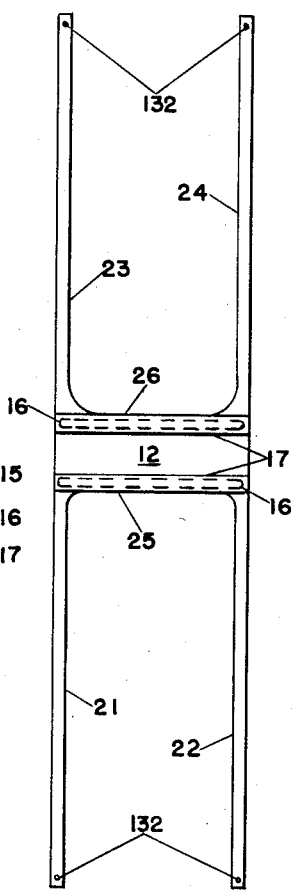
Fig. 2 is a plan view of the capping curtain.

The curtain shutter according to the invention consists of a main curtain 11, shown in Fig. 1, and a capping curtain 12, shown in Fig. 2. The two curtains 11 and 12 may preferably be made of thin sheet metal such as stainless steel. Main curtain 11 is, in the example shown, of even width throughout its entire length, and there is provided in it a transverse exposure slit 13 whose edges 14 and 15 are protected and stiffened by struts such as the spring steel blades 16, 16. Blades 16, 16, are held in place by strips 17, 17, of a suitable material, such as nylon cloth, which are bent around edges 14 and 15 and cemented to curtain 11 on both sides of it.

Capping curtain 12 is somewhat wider, but much shorter than main curtain 11. It is, however, of a length which is larger than the width, that is, the distance between edges 14 and 15, of slit 13 so that the latter may be fully covered by it as will be explained hereinafter. Curtain 12 has four tapes 21, 22, and 23, 24, which extend in pairs in opposite directions, and its edges 25 and 26 are defined and protected by blades 16, 16, and strips 17, 17, in much the same manner as the edges 14 and 15 of slit 13.

Curtains 11 and 12 are supported by a roller structure which is mounted in a housing 30. Housing 30 is shown in Fig. 3 as being part of a camera which is diagrammatically represented as comprising, in addition to housing 30, a camera body 32 with a taking lens 33 and a film magazine 34. Housing 30 may be attached to camera body 32 in any suitable manner which will permit of its speedy removal in case of trouble, while magazine 34 is attached to housing 30 in such a manner as to be easily removable in the course of normal operation; the means for locking magazine 34 in its position on housing 30 being indicated at 35 in Fig. 3. Like camera body 32 and magazine 34, housing 30 is preferably made of an aluminum or magnesium alloy suitable for die casting so that it may readily be manufactured in large quantities with its weight reduced to a minimum.

Referring now to Figs. 4 to 6, housing 30 is a square, frame-like structure into which extend from opposite walls two ribs 37 and 38, respectively. In the example illustrated, ribs 37 and 38 are made integral with housing 30. Within housing 30, furthermore, there are mounted two spaced roller assemblies of which the winding roller assembly is generally designated by the letter W, and the driving roller assembly by the letter D.

The winding roller assembly is supported by a central shaft 40 which is mounted for rotation in ball bearings 41 and 42. Ball bearing 41 is mounted in a block 43, and ball bearing 42 in a block 44, of suitable shape and configuration, and blocks 43 and 44 are attached to ribs 37 and 38, respectively, by screws 45, 45, or like fastening means. Shaft 40 rotatably supports two rollers 48 and 49 which are connected by a hollow shaft 50; shaft 49 being undercut at 51 so as to reduce friction. As clearly shown in Fig. 5, hollow shaft 50 is, in the embodiment of the invention illustrated, made integral with roller 48, while roller 49 is joined with hollow shaft 50 by means of splines 52, 52, provided on the raised portion 53 of shaft 50 and inside the hub 54 of roller 49. On the side opposite hub 54 roller 49 has a recess 55 in order to accommodate a nut 56 screwed to the threaded end 57 of hollow shaft 50 for the purpose of locking roller 49 to hollow shaft 50.

Hollow shaft 50 has bearing surfaces 58 and 59 on which there are mounted ball bearings 60 and 61, respectively, and rotatable about ball bearings 60 and 61 is a drum 65 which thus is rotatably supported by hollow shaft 50. Drum 65 terminates in two flanges 67 and 68 whose diameter is somewhat smaller than that of rollers 48 and 49. Flanges 67 and 68 have threaded holes 71 and 72, respectively, and similar holes 73 and 74 are threaded into rollers 48 and 49, respectively.

The space on hollow shaft 50 between bearing surface 58 and roller 48 is taken up by a raised portion 76 which has a somewhat larger diameter than bearing surface 58. A slot 77 is cut along the circumference of raised portion 76, and a pin 78, threaded into central shaft 40 so as to extend at right angles to it, passes through slot 77 and engages a radial groove 79 cut into the flange 67 of drum 65.

As will readily be seen from an inspection of Figs. 4 and 6, the driving roller assembly is made up of the same parts as the winding roller assembly, but these parts are oriented in the driving roller assembly in a direction opposite to that in which they are oriented in the winding roller assembly. Like parts in the two assemblies hence are designated by like reference numerals in the drawing and throughout this description except for the fact that the numerals designating the parts in the driving roller assembly have a prime (') affixed to them.

It will furthermore be seen that, in the driving roller assembly, a gear 82 is keyed to the portion 83' of hollow shaft 50' which extends beyond roller 48', while a gear 84 is similarly secured to the end 85' of central shaft 40' which extends beyond hollow shaft 50'. Rib 38 is suitably recessed, as indicated at 86 in Fig. 6, to accommodate gears 82 and 84, and a recess 87 is provided in housing 30 for the block 88 in which ball bearing 41' is mounted. The hubs, finally, of gears 82 and 84 are of such a shape and configuration as to permit gear 82 to mesh with the gear teeth 89 cut into the raised rim 90 of a spring casing 91, and to permit gear 84 to mesh with the gear teeth 92 cut into the raised rim 93 of a spring casing 94.

Referring now to Fig. 7, casings 91 and 94 are rotatably supported by two shafts 95 and 96, respectively. Shaft 96 is hollow and fits over the reduced portion 97 of shaft 95 which terminates a short distance from the end 98 of hollow shaft 96, as shown. End 98 is likewise undercut so that a shoulder 99 is formed by means of which hollow shaft 96 is seated in a bore 100 provided in a recess 101 in housing 30. At its other end, the assembly consisting of shafts 95 and 96 is supported by a housing 103 which may be quadrant-shaped as shown in Fig. 6. The side wall 104 of housing 103 may be reinforced at suitable places 105, 105, for the reception of holes into which screws may be threaded from the recessed outside of housing 30 as shown at 106 in Figs. 4 and 7. On its top, housing 103 has a hole 107 through which the reduced portion 108 of shaft 95 extends; a washer 109 of suitable material such as steel being placed between the cover plate 110 of casing 91 and housing 103 in order to reduce friction. To the same end, a similar washer 112 is placed between the cover plate 113 of casing 94 and housing 30, and hollow shaft 96 is provided with a flange 114 which separates casings 91 and 94. Inside of casings 91 and 94 there are provided blade springs 116 and 117, respectively, which may be of the type generally employed for watch springs. As indicated at 118 and 119, respectively, spring 116 is riveted at one end to casing 91 and at the other end to shaft 95, and as indicated at 121 and 122, respectively, spring 117 is similarly secured at one end to casing 94 and at the other end to hollow shaft 96. As shown in Fig. 6, finally, rib 38 has a recess 125 so as not to interfere with the rotation of casings 91 and 94.

Referring again to Figs. 1 and 2, there are provided in the four corners of main curtain 11 holes 131, 131, through which small screws (not shown) may be threaded into the holes 71 and 72 in flanges 67 and 68, respectively, and into the holes 71' and 72' in flanges 67' and 68', respectively. Similar holes 132, 132, are provided at the ends of the tapes 21, 22, 23, and 24, of capping curtain 12 so that small screws (not shown) may be threaded through holes 132, 132, into the holes 73 and 74 in rollers 48 and 49, respectively, and into the corresponding holes (not shown) in rollers 48' and 49'. In this manner, main curtain 11 is supported by drums 65 and 65' and capping curtain 12 by rollers 48, 48', 49, and 49', although other ways of attaching the two curtains to their drums and rollers, respectively, will readily suggest themselves to those skilled in the art. The position of curtains 11 and 12 relative to one another and to their supporting structure is indicated in a somewhat diagrammatic manner in Fig. 4 for the case in which half of exposure slit 13 is covered by curtain 11. [For the sake of greater clearness in the illustration of the curtain supporting structure proper there have been omitted from Fig. 4 the reinforcement blades 16, 16, and strips 17, 17, and the portions of curtain 11 and tapes 21, 22, 23, and 24, which in the position of the two curtains shown, are wrapped around flanges 67, 67', 68, and 68', and around rollers 48, 48', 49, and 49', respectively.]

As has been pointed out hereinbefore, any suitable mechanism may be employed for effecting the operations of winding, setting, releasing, and capping, the curtain shutter forming the subject matter of the present invention. Such shutter control mechanism is, in the embodiment of the invention illustrated, assumed to be installed in the camera body 32 as indicated by the location of the shutter control knob 140 in Fig. 3. It hence must be operatively connected to the winding roller assembly located in housing 30. This connection may, for example, be made through two gear trains of suitable design which may terminate in two gears 145 and 146; gear 145 being keyed to the portion 83 of hollow shaft 50 which extends beyond roller 48, and gear 146 being similarly secured to the end 85 of central shaft 40 which extends beyond hollow shaft 50: see Fig. 4.

As will be understood from the foregoing description of the winding and driving roller assemblies, rollers 48 and 49, and 48' and 49', are movable independently of drums 65 and 65', respectively, to the extent permitted by the size of the slots 79 and 79' in hollow shafts 50 and 50', respectively. For the purpose of covering exposure slit 13 either fully or in part, therefore, capping curtain 12 may be moved in relation to main curtain 11 by holding stationary the gear train terminating in gear 146 on central shaft 40, while imparting drive to the gear train terminating in gear 145 on hollow shaft 50. In order, finally, successfully to perform the setting and capping as well as the winding and releasing operations by means of the control mechanism referred to above it is necessary that shaft 95 and hollow shaft 96 which carry spring casings 91 and 94, respectively, be held stationary except when it is desired to rotate them for the purpose of adjusting the tension of springs 116 and 117, respectively. This object is attained by means of the following arrangement (see Figs. 4, 6, and 7):

Into the reduced portion 108 of shaft 95 there are cut immediately on top of housing 103 two flats 151, 151, so that a locking disk 153 having a corresponding cut-out 154 may be placed over portion 108. Disk 153 which thus is keyed to portion 108, rests on top of housing 103 as shown, and has a number of notches 155 which are adapted to be engaged by a stop 156 threaded into housing 103. Above flats 151, 151, shaft 95 is further reduced to an end portion 157 which is again of round cross-section. End portion 157 has a groove 158 which is engaged by a spring retainer 159 for the purpose of holding disk 153 in its place.

Similarly, two flats 161, 161, are cut into the reduced portion 98 of hollow shaft 96 immediately below the bottom 162 of recess 101 in housing 30, and a locking disk 163 having a corresponding cut-out is placed over portion 98. Disk 163 rests against bottom 162 as shown, and has a number of notches (not shown) which are similar in appearance to the notches 155 of disk 153, and which are adapted to be engaged by the stop 166 threaded into housing 30. Below flats 161, 161, shaft 96 is further reduced to an end portion 167. End portion 167 is again of a round cross-section, and has a groove 168 for engagement by a spring retainer 169.

By virtue of the engagement of notched disks 153 and 163 by stops 156 and 166, respectively, shaft 95 and casing 91, and hollow shaft 96 and casing 94, are held stationary so that torque transmitted by gears 82 and 84 to gear teeth 89 and 92, respectively, will effect a tensioning of springs 116 and 117, respectively. If, on the other hand, it is desired to adjust the initial tension of springs 116 and 117, stops 156 and 166 may temporarily be removed and shafts 95 and 96 be rotated until the desired tension is obtained—for example by inserting a screw driver into the slot 171 cut into the end of the reduced portion 97 of shaft 95, or into the slot 172 cut into the end portion 167 of shaft 96. Recess 101, finally, may expand at its top so as to form a seat 173 for a cover plate 174. Cover plate 174 thus may be mounted flush with the outer surface of housing 30 to which it may be removably attached in any suitable manner.

In the modification of the driving roller assembly shown in Figs. 8 and 9, housing 103 and its contents are dispensed with which, at times, may be desirable, for example, in order to use the space taken up by it for other parts of the camera mechanism. In consequence, there have been provided, in place of the external blade springs 116 and 117 of the previous modification, the coiled springs 176 and 177. Springs 176 and 177 are positioned adjacent to one another within the hollow shaft 178 of the modified driving roller assembly and surround its central shaft 179. Central shaft 179 is rotatably supported by two bearing blocks 182 and 183, and a gear 184 with an elongated hub 185 is placed over that end of it which is supported by block 183; the two parts being connected by a pin 186 on shaft 179 engaging a slot 187 in the face of gear 184. In its turn, central shaft 179 rotatably supports, by means of two ball bearings 188 and 189, the two rollers 191 and 192 which are connected by hollow shaft 178. Roller 191 is preferably made integral with hollow shaft 178, as shown in Fig. 8, and roller 192 is joined with it in the same manner as roller 49 is joined with hollow shaft 50 in the construction previously described. A lock nut 193 holds roller 192 in place and also serves to mount the assembly consisting of rollers 191 and 192 and hollow shaft 178 on ball bearing 189, while ball bearing 188 is inserted with a tight fit into the bore 194 in roller 191; a washer 195 being placed between block 182 and ball bearing 188 so as to engage the inner race ring of the latter.

By means of the two ball bearings 197 and 198, hollow shaft 178 rotatably supports drum 199 whose flange 200 is notched as indicated at 201. Notch 201 is engaged by a pin 202 which extends through the circumferential slot 203 in hollow shaft 178 and is threaded into a collar 206. Collar 206 has its bearing on central shaft 179, and is engaged by one end of spring 176. The other end of spring 176 is attached to a collar 207 which is secured by a pin 208 to central shaft 179. Pin 202 thus extends at right angles to central shaft 179 and is supported by it with the aid of collar 207, spring 176, and collar 206. One end of spring 177 is likewise attached to collar 207, while its other end engages a collar 209 which is clear of central shaft 179 and is screwed, or otherwise fastened, to hollow shaft 178.

In order to keep central shaft 179 from rotating—except when it is desired to adjust the tension of springs 176 and 177—gear 184 is engaged by a worm 212 which is mounted for rotation in block 183. Worm 212 terminates in a short shaft 213 with a slot 214 into which a screw driver may be inserted for the purpose of the afore-mentioned adjustment. Shaft 179 thus remains stationary during the entire cycle of operation of the shutter, and hence need not be mounted on ball bearings as are the corresponding shafts 40 and 40' of the winding and driving roller assemblies shown in Fig. 4. Since, furthermore, sufficient space must be provided inside of hollow shaft 178 for the accommodation of springs 176 and 177 and of collars 206, 207, and 209, hollow shaft 178 must have a larger diameter than hollow shafts 50 and 50' so that it is preferable to mount hollow shaft 178 on central shaft 179 not directly, but by means of the ball bearings 188 and 189 as described.

On account of the adaptation of central shaft 179 and hollow shaft 178 to a condition present only in the driving roller assembly of Fig. 8, it is not feasible to incorporate these parts in a winding roller assembly. Instead, the winding roller assembly of Fig. 4 may well be employed with the driving roller assembly of Fig. 8, and while the curtain shutter structure resulting from this combination has to be made up from a larger number of different parts than the one shown in Fig. 4, it is of a particularly compact and sturdy construction.

Curtains 11 and 12 may be attached to the drum 199 and the rollers 191 and 192, respectively, of the driving roller assembly of Fig. 8 in the same manner as to the drum 65 and the rollers 67 and 68, respectively, of the winding roller assembly associated with it. When then the curtain shutter is wound, springs 176 and 177 are tensioned because central shaft 179 with collar 207 remains stationary so that torque is exerted on spring 176 by main curtain 11 through drum 199 with notch 201, pin 202 and collar 206, and on spring 177 by capping curtain 12 through tapes 21 and 22, rollers 191 and 192, hollow shaft 178 and collar 209. Conversely, the drive will be transmitted through the same paths from springs 176 and 177 to curtains 11 and 12, respectively, when the shutter is released.

While springs 116 and 117, and springs 176 and 177, have been shown in Figs. 7 and 8, respectively, as being of equal strength, they may also be made of different strength, for example, in order to compensate for the difference in mass of the parts associated with main curtain 11 and capping curtain 12, respectively. The two roller assemblies, furthermore, may be mounted in housing 30 so as to extend in whichever direction it is most suitable in accordance with the requirements of the particular camera of which housing 30 is to be a part. While, for example, the winding and driving roller assemblies are shown in Fig. 4 as being oriented in opposite directions, the winding roller assembly may also be oriented so that the end to which gears 145 and 146 are attached, is mounted on rib 38 or, conversely, the driving roller assembly may be oriented so that the end to which gears 82 and 84 are attached, is mounted on rib 37. In the latter case, housing 103 and its contents must be transferred from the position adjacent to rib 38 in which it is shown in Figs. 4 and 6, to a position adjacent to rib 37, and in either position of housing 103 care must be taken that it, or any of the parts associated with it, does not interfere with the rays of light proceeding from the lens 33 through the exposure opening towards the focal plane of the camera. The exposure opening is diagrammatically indicated by the broken line 221 in Fig. 4, while the frame (not shown) defining it may in actual practice be mounted on either housing 30 or magazine 34.

As already mentioned hereinabove, rollers 48 and 49, and rollers 48' and 49' or rollers 191 and 192, with capping curtain 12 are movable independently of drums 65, and 65' or 199, with main curtain 11 to the extent permitted by the size of circumferential slots 79, and 79' or 203. The arcuate length of these slots must hence be at least large enough to permit a longitudinal displacement of curtain 12 with respect to curtain 11 which is equal to the width of exposure slit 13 plus half the margin considered necessary to cap slit 13 safely; the full safety margin plus the width of slit 13 constituting the minimum length of curtain 12.

The maximum length of curtain 12 is determined by the fact that it can be wrapped around rollers 48 and 49, and rollers 48' and 49' or rollers 191 and 192, only over a portion of their circumference in order to avoid its striking, with either edge 25 or edge 26, curtain 11; compare Fig. 6. The length of curtain 12 and, consequently, the width of slit 13 thus are limited by the size of the diameter of the aforementioned rollers. Assuming, for example, this diameter to be .75 inch, the maximum length of curtain 12 then could be 1.4 inches which would permit of a width of .6 inch for slit 13. With such a slit width and an arcuate length of approximately 200 degrees for slots 79, and 79' or 203, shutter speeds in the range from about $\frac{1}{250}$ to $\frac{1}{2000}$ of a second would be obtainable.

No limitation is imposed by this condition on the usefulness of the curtain according to the present invention since, nowadays, there exist a sufficient number of applications, as for instance in aerial cameras, for a shutter capable of producing only the relatively high speeds of exposure. Moreover, a suitable range of slow speeds may conveniently be provided for the curtain shutter disclosed herein by adding to it a retard mechanism of well known characteristics and design or, although this expedient will be practical only in rare cases, by substantially enlarging the diameter of the aforementioned rollers.

It has already been pointed out hereinabove that the structures shown and described in this specification are the presently preferred embodiments of the invention and that they have been given by way of illustration, and not by way of limitation. Likewise, while specific terms have been employed for the explanation of these structures, they have been used in a descriptive and generic sense and not for purposes of limitation, the scope of the invention being set forth in the following claims.

What is claimed is:

1. A curtain shutter structure including, in combination, a main curtain having an exposure slit; a capping curtain comprising four tapes, two of said tapes extending in one direction and the other two extending in the opposite direction; a winding drum for said main curtain; two winding rollers for said capping curtain, each of said first mentioned two tapes being attached to one of said winding rollers; a first hollow shaft connecting said winding rollers and having a first circumferential slot, said winding drum being rotatable about said first hollow shaft; a first gear carried by said first hollow shaft adjacent to one of said winding rollers; a first shaft rotatably supporting said winding rollers and said first hollow shaft and carrying a second gear adjacent to said first gear; a first pin attached to said first shaft, said first pin extending at right angles to said first shaft and engaging said winding drum through said first slot; a driving drum for said main curtain; two driving rollers for said capping curtain, each of said two last mentioned tapes being attached to one of said driving rollers; a second hollow shaft connecting said driving rollers and having a second circumferential slot, said driving drum being rotatable about said second hollow shaft; a second shaft rotatably supporting said driving rollers and said second hollow shaft; a first coiled spring having a first end and a second end, said first spring surrounding said second shaft, said first end being attached to said second shaft and said second end engaging said second hollow shaft; a second coiled spring having a third end and a fourth end, said second spring surrounding said second shaft and said third end being attached to said second shaft; and means rotatable about said second shaft and carrying a second pin which extends at right angles to said second shaft, said means being engaged by said fourth end and said second pin engaging said driving drum through said second slot.

2. Mechanism for driving a curtain shutter which comprises a main curtain having an exposure slit and a capping curtain provided with tapes, said mechanism including, in combination, a drum to which said main curtain may be attached; a first roller to which one of said tapes may be attached; a second roller to which another of said tapes may be attached; a hollow shaft connecting said first and second rollers and having a circumferential slot, said drum being rotatable about said hollow shaft; a shaft rotatably supporting said first and second rollers and said hollow shaft; a first coiled spring having a first end and a second end, said first spring surrounding said shaft, said first end being attached to said shaft and said second end engaging said hollow shaft; a second coiled spring having a third end and a fourth end, said second spring surrounding said shaft and said third end being attached to said shaft; and means being rotatable about said shaft and carrying a pin which extends at right angles to said shaft, said means being engaged by said fourth end and said pin engaging said drum through said slot.

3. The combination defined in claim 2, and wherein said second spring surrounds said shaft adjacent to said first spring.

4. The combination defined in claim 2 in which said shaft is engaged by said first end of said first spring and also by said third end of said second spring, a worm gear is attached to one end of said shaft, and a worm meshes with the worm gear and has a short shaft extending through a supporting block, said short shaft being rotatable from the exterior of the support block to adjust the tension of both the first and second springs simultaneously.

References Cited in the file of this patent

UNITED STATES PATENTS

| | | |
|---|---|---|
| 708,727 | Nather | Sept. 9, 1902 |
| 2,039,517 | Black | May 5, 1936 |
| 2,134,766 | Schieber et al. | Nov. 1, 1938 |
| 2,608,921 | Studdert | Sept. 2, 1952 |